Figure 1:
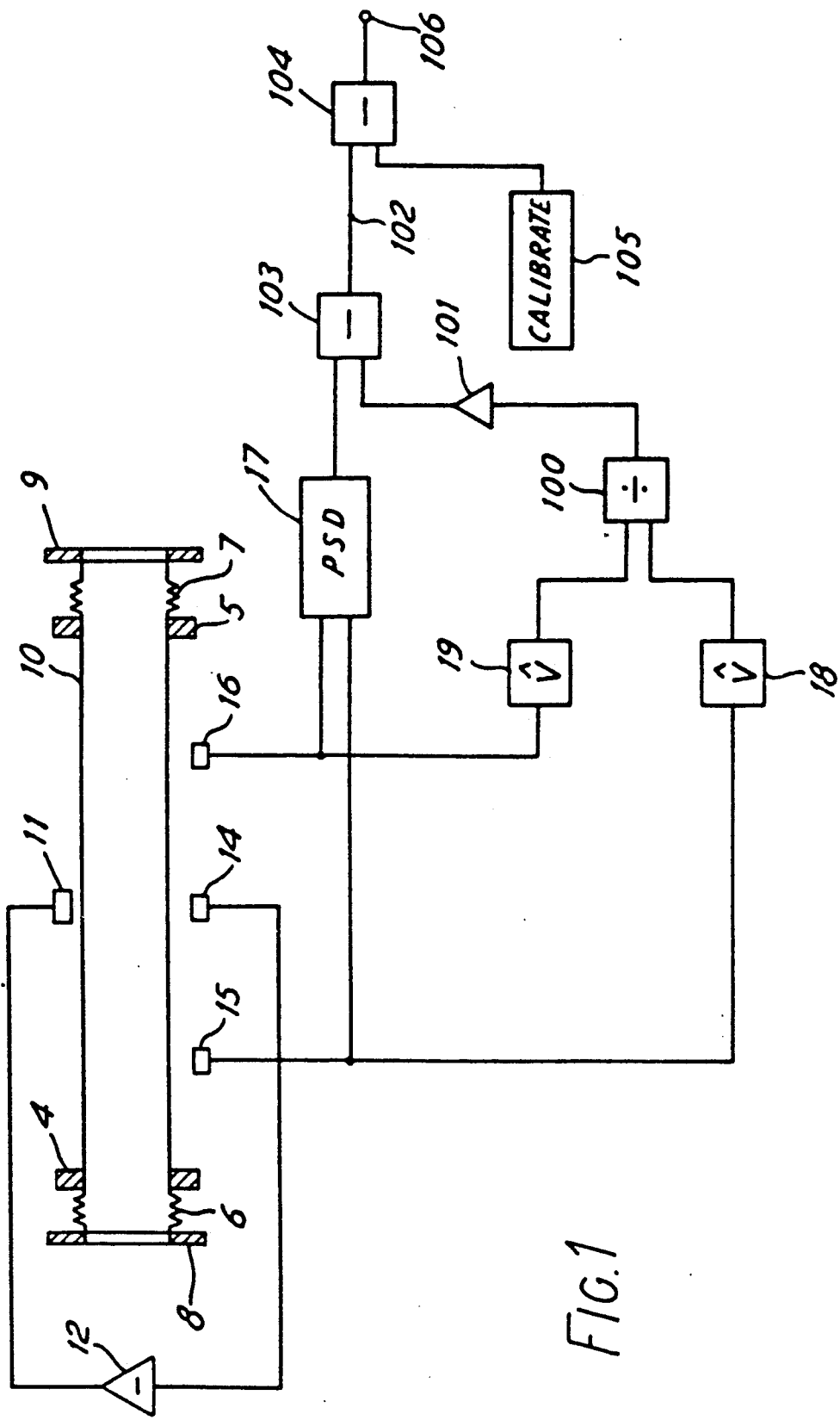

United States Patent [19]
Atkinson et al.

[11] Patent Number: 5,044,207
[45] Date of Patent: Sep. 3, 1991

[54] MASS FLOW MEASUREMENT

[75] Inventors: David I. H. Atkinson, Farnham; Steven C. Doe, Camberley, both of England

[73] Assignee: Schlumberger Industries Limited, Farnborough, England

[21] Appl. No.: 167,087

[22] Filed: Mar. 11, 1988

[30] Foreign Application Priority Data

Mar. 11, 1987 [GB] United Kingdom ................ 8705758

[51] Int. Cl.$^5$ .............................................. G01F 1/84
[52] U.S. Cl. ............................................... 73/861.37
[58] Field of Search ........................ 73/861.38, 861.37

[56] References Cited

U.S. PATENT DOCUMENTS

| 3,329,019 | 7/1967 | Sipin | 73/861.38 |
|---|---|---|---|
| 3,927,565 | 12/1975 | Pavlin et al. | 73/861.38 |
| 4,252,028 | 2/1981 | Smith et al. | 73/861.38 |
| 4,691,578 | 9/1987 | Herzl | 73/861.38 |
| 4,703,660 | 11/1987 | Brenneman | 73/861.38 |
| 4,891,991 | 1/1990 | Mattar et al. | 73/861.38 |

FOREIGN PATENT DOCUMENTS

| 58-153121 | 3/1982 | Japan . |
|---|---|---|
| 58-156813 | 3/1982 | Japan . |
| 8706691 | 11/1987 | PCT Int'l Appl. . |
| 2851162 | 3/1983 | U.S.S.R. . |
| 2171200 | 8/1986 | United Kingdom . |
| 2192714 | 1/1988 | United Kingdom . |

Primary Examiner—Herbert Goldstein
Attorney, Agent, or Firm—Sanford J. Asman

[57] ABSTRACT

A coriolis-type mass flow transducer comprises a straight tube 10 through which a fluid whose mass flow rate is to be measured is arranged to flow while the tube is set into transverse resonant vibration in its second overtone mode. Mass flow is determined by measuring the phase difference between the vibration at two points along the tube 10. Such a transducer exhibits an offset at zero flow, which can vary with time. These variations are minimized by minimizing the damping effects on the tube 10 of bellows 6, 7 used to connect tube 10 in a flow line, and then corrected by measuring the amplitude ratio of the vibrations at the two points, and correcting the initially-determined offset in dependence upon changes in this amplitude ratio.

5 Claims, 2 Drawing Sheets

MASS FLOW MEASUREMENT

This invention relates to the measurement of mass flow, and in particular to vibrating element mass flow sensors, wherein a measurement of mass flow is obtained by determination of phase difference between two vibrating points spaced apart along the element.

Typically, a vibrating element mass flow meter might comprise one or more tubes which carry a flowing liquid, the mass flow of which is to be measured. The tube structure might for example be centrally excited to vibrate in a fundamental mode, and the phase difference arising by virtue of coriolis effects at vibrating points spaced equidistant from the centre measured. Such a measurement is representative of mass flow in the tube structure. A description of such an arrangement is to be found in published European Patent Application No. EP 119,638.

Meters of this type have a non-zero phase difference at zero mass flow due to, for example, stresses induced in the system by the connecting bolts or orientation effects or temperature gradients. To compensate for this the phase difference is measured at zero mass flow through the pipe in the installed position and a correction applied. It is recommended that the correction is checked periodically, resulting in the undesirable necessity of flow interruption whilst the correction is computed.

According to the present invention, a mass flow transducer includes:
a vibratable element mass flow sensor;
means for exciting said element into vibration;
means for determining the value of the phase difference in the vibration between first and second positions along the sensor;
means for determining an amplitude of the vibration; and
means for correcting the phase difference value in dependence upon the amplitude, such that the corrected value is representative of mass flow.

Advantageously, a mass flow transducer in accordance with the present invention is arranged to provide correction in dependence upon the amplitude ratio of the vibration occurring at the first and second positions.

Figure 2:
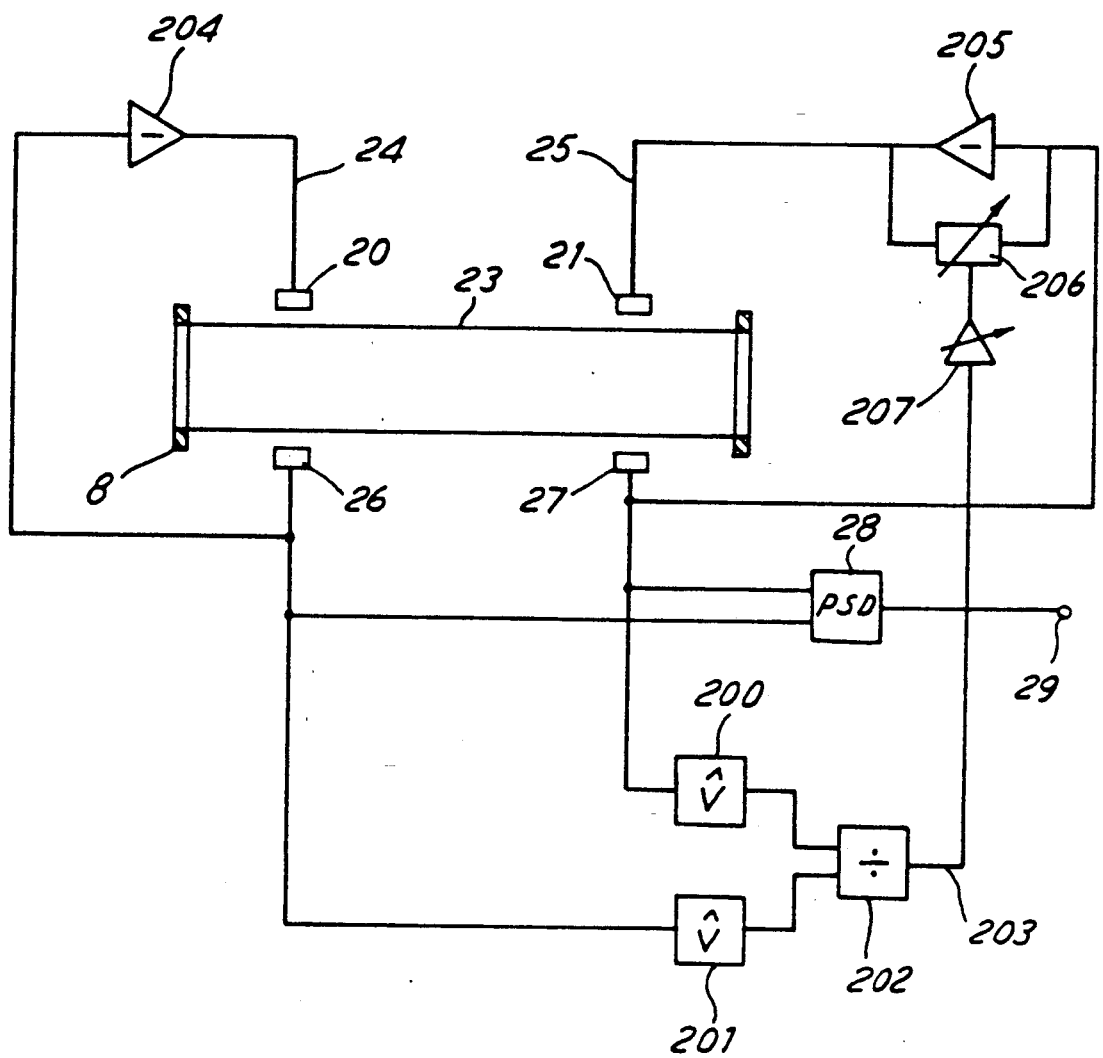

In order that features and advantages of the present invention may be further appreciated, embodiments will now be described, by way of example only, with reference to the accompanying diagrammatic drawings, of which:

FIG. 1 represents a mass flow transducer in accordance with the present invention; and FIG. 2 represents an alternative mass flow transducer, also in accordance with the present invention.

A vibrating element mass flow transducer (FIG. 1) includes a tube 10, carrying a fluid whose mass flow rate is to be measured. The tube 10 is excited into vibration by excitation means 11, which may for example comprise a drive coil in the case of a tube of ferromagnetic material. Welded to the open ends of the tube 10 are respective node-forming structures in the form of clamping rings 4, 5, which are sufficiently massive to hold the ends of the tube substantially motionless when the tube is vibrating.

The excitation means 11 is driven by an inverting amplifier 12 which receives a signal from a pick-up means 14, the arrangement being such as to ensure positive reinforcement of vibration of the tube 10, which is thereby maintained in resonant vibration, preferably in mode 3 (that is the second overtone, with three half wavelengths of vibration between the rings 4, 5). The excitation means 11 is preferably controlled by the amplifier 12 to apply a substantially constant driving force to the tube.

To permit the tube 10 to be connected in series in a flow line through which the fluid whose mass flow rate is to be measured is flowing, the open ends of the tube within the clamping rings 4, 5 are welded to respective metal bellows 6, 7, which are in turn welded to respective mounting flanges 8, 9. The bellows 6, 7, perform two functions: they can absorb differential thermal expansion of the tube 10 with respect to the flow line in which it is connected, and they tend to isolate the tube from vibration and noise in the flow line.

Given a fluid flow in tube 10, it is known that there is a phase difference in vibration between points spaced equidistant from the tube centre along its length; it is also known that such phase difference is representative of mass flow. Thus the phase difference in signals provided by pick-up means 15 and 16, positioned as aforesaid, will be representative of mass flow.

This phase difference measurement, which is essentially that made in prior art mass flowmeters based upon coriolis effects, exhibits an offset with respect to actual massflow, that is, there is a non-zero phase difference under conditions of no flow. Simple sensor offset may of course be calibrated out to yield a value of actual mass flow. Unfortunately the magnitude of the offset has been found to vary with time, making a single initial calibration of the sensor inadequate.

It is believed that the variations in offset are due to relative changes in the mounting conditions at the ends of the tube 10, and that these relative changes are in turn due primarily to mismatching of the bellows 6, 7. To enable the bellows 6, 7 to withstand high pressure fluids, it has been the practice to make them in four-ply form, that is from four thin layers of metal pressed together: the use of thin layers permits deep corrugations to be pressed into the metals without cracking, while the use of four such layers achieves the desired high pressure capability.

However, such four ply bellows exhibit considerable variations, i.e., they are difficult to match with each other, and have a very low Q: they therefore exert a significant and variable damping on the tube 10.

The inventors have found that if the damping effect of the bellows 6, 7 is significantly reduced, the offset variations also become much smaller, and more predictable. In particular, the offset variations become proportional to the ratio of the amplitudes of vibration at the points between which phase difference is measured. This ratio may therefore be used to correct offset drift directly, more especially as it is independent of flow-induced coriolis effects.

The way in which the damping effect of the bellows 6, 7 can be reduced is to make them of two-ply, or better still, single-ply, metal sheet. The inventors have found that two-ply bellows give a 4:1 reduction in offset variation, while single-ply bellows can give a 16:1 reduction, the trade off being that the bellows become more difficult and more expensive to make as the number of plies is reduced while still requiring the same pressure capability.

To correct for the offset variations, signals from pick-up means 15 and 16 are relayed to a phase sensitive detector 17 which serves to provide an output signal dependent upon the phase difference between the received signals, and thereby proportional to mass flow. The output signal of phase sensitive detector 17 is of the type provided by prior art coriolis-based mass flow measurement, and thus subject to offset drift. However, the peak amplitude of the vibration picked up by pick up means 15 is detected by a detection circuit 18, and similarly that of vibration picked up by pick-up means 16 by a detection circuit 19. The ratio of these two peak amplitudes is obtained by virtue of a divider 100. This ratio may be applied, after suitable scaling 101 dependent upon the various gains within the system, as a difference signal to the output signal of phase sensitive detector 17 to yield an offset corrected signal at the output 102 of a subtracter 103.

For some arrangements, the signal at output 102 of subtracter 103 may be provided as an output directly representative of mass flow. In other arrangements, there may be some residual offset, no longer subject to drift, and this may be subtracted out by a subtracter 104 acting on a stored value 105 recorded under no flow conditions. Subtracter 104 then provides at its output 106 an output signal representative of mass flow in tube 10.

In an alternative embodiment of the present invention (FIG. 2), two excitation means (or exciters) 20, 21 acting upon a tube sensor 23 (which is substantially identical to the tube sensor 10 of FIG. 1, but which has been simplified by the ommission of clamping rings 4, 5 and bellows 6, 7) provide a capability for asymmetric excitation by virtue of, for example, application of excitation signals at 24, 25 of different amplitudes. Signals from pick-ups 26 and 27 are connected to a phase sensitive detector 28 to provide a phase difference output at 29 in a way analogous to that derived with respect to the embodiment of FIG. 1. Also in a way analogous to the embodiment of FIG. 1, amplitude detection circuits 200, 201 and divider circuit 202 provide a signal at 203 dependent upon the ratio of the amplitudes of the signals from pick-ups 26 and 27.

Exciter 20 is driven by a maintaining amplifier 204 which provides the driving signal at 24 dependent upon an input signal received from pick-up 26; this arrangement is operated in the same way as the central excitation of the embodiment of FIG. 1, but it will be noted that in the case of the present embodiment, exciter 20 and pick-up 26 are not central.

Exciter 21 is similarly driven by a maintaining amplifier 205 dependent upon an input signal from pick up 27. The gain of amplifier 205, and thereby the amplitude of the driving signal at 25, is controlled by feedback element 206 of amplifier 205. The effective value of this element is controlled by the signal at 203. Thus maintaining amplifier 205 is arranged as a gain-controlled amplifier whose gain is dependent upon the amplitude ratio of the signals derived from pick ups 26 and 27. The range of the gain control signal 203 is adjusted by a variable element 207 such that the controlled feedback loop provided by pick up 27, maintaining amplifier 205, and exciter 21 settles to provide a constant amplitude ratio between the signals picked up by pick ups 26 and 27; any momentary changes in amplitude ratio being dynamically cancelled by the action of the loop.

With the arrangement described above, the phase difference signal provided at 29 by the phase sensitive detector 28 is directly representative of mass flow, being automatically and dynamically corrected in accordance with the principles already described. An initial calibration, to establish the value of the constant amplitude ratio necessary to provide correction for particular installation may be required. This may be straightforwardly achieved by adjusting element 207 such that a zero output 29 is provided under no flow conditions.

A further advantage of the present embodiment is that amplitude ratio may be monitored for changes which take it outside a predetermined range. Such a variation is indicative of a possible fault, for example failure of a pick-up, and may be used to trigger an appropriate warning.

In this second embodiment, amplitude controlled asymmetric drive is used. As an alternative, phase controlled asymmetric drive may be employed, the drive signals supplied to exciters 20 and 21 being substantially constant in amplitude, but controlled in phase difference dependent upon amplitude ratio of the resulting vibration.

Although embodiments of the present invention have been described with reference to single straight tube sensors, it will be appreciated that the invention is equally applicable to other types of vibrating element sensor, include twin and multiple straight tube structures and folded tube structures.

As an alternative to using the peak amplitude ratio as described above, other amplitude ratios such as root mean square or other integrals may be employed.

We claim:

1. A mass flow transducer comprising:
a vibratable element mass flow sensor;
means for exciting said element into vibration;
means for determining the value of the phase difference in the vibration between first and second positions along the sensor;
means for determining an amplitude of the vibration;
means for correcting the phase difference value in dependence upon the amplitude, such that the corrected value is representative of mass flow; and
means for determining the amplitude ratio of the vibration occurring at the first and second positions, and wherein the correction is dependent upon the amplitude ratio.

2. A mass flow transducer as claimed in claim 1, wherein said element comprises a transversely vibratable straight tube through which a fluid whose mass flow is to be measured is arranged to flow, respective node-forming structures at each end of the tube for holding said ends substantially motionless during vibration of the tube, and respective axially resilient connecting means at each end of the tube for connecting the tube in a flow path to receive said fluid, each said connecting means being arranged to exert substantially the same, relatively low, damping effect on said tube.

3. A mass flow transducer as claimed in claim 2, wherein each said connecting means comprises a bellows member pressed from sheet metal, said sheet being no more than two-ply.

4. A mass flow transducer as claimed in claim 3, wherein said sheet is single-ply.

5. A mass flow transducer as claimed in claim 2, wherein said exciting means is arranged to excite transverse resonant vibration of said tube in the asymmetric mode.

* * * * *